Patented July 20, 1954

2,684,307

UNITED STATES PATENT OFFICE 2,684,307

PROCESS OF IMPREGNATING A MICROPOROUS ARTICLE

Gordon W. Knapman, Beverly Hills, and Maynard Jordan Nathason, Pasadena, Calif.

No Drawing. Application November 13, 1951, Serial No. 256,164

1 Claim. (Cl. 117—61)

This invention relates to the impregnation of materials with a liquid impregnant for the purpose of preserving or water-proofing the impregnated materials or of bonding the materials, and more particularly relates to a process of impregnation with materials which substantially preserve their liquidity until subjected to heat-treatment, of which thermosetting copolymers form an important example. While a major use of the process is the impregnation of metals, both ferrous and non-ferrous, the process may also be used to impregnate glass, hard plastics, hard rubber, neoprene, and similar materials to cause an intimate and strong bonding of such materials, either to one another or to metals.

This application is a continuation in part, as to all common subject-matter, of our copending application of the same title, Serial No. 148,004, filed March 6, 1950, now abandoned. This present application amplifies some of the details of that parent case, and supports some of them by amplified showings.

It is an object of our invention to provide a process of impregnation using thermosetting copolymers as the impregnant, which will more thoroughly impregnate suitable articles than has been hitherto possible.

A further object of our invention is to provide a process of impregnation which will permit a bath of thermosetting copolymer impregnant to be used repeatedly in batch operations.

A leading difficulty which has arisen in the past in the use of thermosetting copolymers as impregnating or bonding agents has been the tendency of the copolymers to harden prematurely, making their use costly and sometimes impossible, especially when it has been necessary to utilize a large batch of impregnating material, as in a bath for castings, and to continue the bath for a period of time required to obtain satisfactory penetration of the pores of the castings. With some types of plastic coatings for metals, it has been found advantageous to apply a vacuum to the castings prior to the coating bath, in order to remove ultra-minute air particles from the surface and micropores of the metal. But it has not been found practical to use an effective degree of vacuum in conjunction with impregnating materials which harden as their more volatile constituents are driven off, as in thermosetting, because such a degree of vacuum draws off the volatile constituents as effectively as they are driven off by heat.

It is not commonly realized that air lodged in the micropores of metal adheres to the metal with a force which tends to nullify or offset the expansion to be expected from Boyle's law—a phenomenon which may be verified by applying a vacuum to a bubble caught between threads of colored liquid in a very fine capillary glass. By micropores we mean pores requiring magnification for visibility. To be effective in the micropores of metal and other close-grained or amorphous materials, the absolute pressure at the surface must be much lower than is required merely to detach large air bubbles from the surface. We have found that good results in eliminating air from the pores require an expectancy under Boyle's law of around twenty-fold expansion of the occluded air particles, the actual expansion being much less. In terms of pressure, such an expected expansion would correlate to an absolute pressure of 0.735 p. s. i., or to a vacuum of 28.5 inches of mercury related to a 30 inch barometric pressure. Hitherto it has been found that a vacuum of 26 or even 27 inches of mercury, at room temperature or used with warm castings, they are often preheated to remove moisture, would result in so thickening a thermosetting copolymer impregnant of volatile characteristics as to deprive it of capillary penetration into micropores. The longer the impregnating bath lasted under vacuum, the less effective it became, and a batch of impregnant could seldom be used for a second bath. It may here be noted that at a vacuum of 27 inches of mercury there is theoretically twice as much air left in the micropores as at a vacuum of 28.5 inches, which undoubtedly had an effect in preventing penetration by the impregnant; however, failure of the impregnant to penetrate has generally been ascribed to increased viscosity, as this effect was the more obvious.

We have found that it is possible to utilize a vacuum of 28.5 inches of mercury, or even higher, by cooling a thermosetting copolymer impregnant to a temperature which sufficiently decreases the vapor tension of the volatile constituents of the impregnant to prevent their escape in material quantity. Only in the absence of escaping vapor is it possible to obtain the high degree of evacuation of the micropores which is essential to their subsequent impregnation. And contrary to the prevalent idea that cooling the impregnant would increase its viscosity and render it less penetrative, we have found that the increase in viscosity due to cooling is more than offset by the maintenance of fluidity attributable to a low rate of evaporation. There is, to be sure, an increase in viscosity attributable to the low temperature, but a much greater loss in fluidity is avoided. And the fifty percent reduction in the density of the residual air in the micropores resultant from increasing the vacuum from an unsatisfactory 27 inches of mercury to 28.5 inches, greatly increases the penetration of the slightly more viscous impregnant, both by capillary action and by vacuum suction.

It will be understood that the process herein described is a physical process, capable of acting upon thermosetting copolymers of diverse chemical organization, and therefore not to be limited to a specific impregnant. Obviously, it is not applicable to thermo-plastic impregnants which solidify when cooled, or to solutions dependent on drying by evaporation of volatile solvents rather than by polymerization by heat, as such solutions could easily be rendered unfit for repeated baths. Numerous resin compounds are known and available under a wide range of trade-names which have the desired characteristics that they set by polymerization under heat, and although when in liquid phase they are subject to evaporation, their volatility is, or may be, a subordinate factor in their change to the solid state.

An example of a thermosetting copolymer impregnant suitable for use with our process is an esterification product of an organic polyglycol with an unsaturated polybasic acid, diluted with monomeric styrene. The dilution may suitably be of the order of 70 parts of the polyester and 30 parts of the styrene, with a trace of an organic reducing agent such as hydroquinone. Such an impregnant is maintained as a liquid through lack of cross-linkage. Prior to its application as a bath, the impregnant is charged with a latent peroxide catalyst, as a consequence of which the equilibrium of the impregnant will be destroyed by heat, a cross-linking type of polymerization occurring at temperatures of 250 degrees Fahrenheit or above.

Impregnants of composition analogous to that stated above and therefore responsive to our process are available commercially under the trade-names: Laminac, Paraplex, Selectron, Thalid, and MR. An example of a suitable impregnant will be found in the formulations:

|  | Equivalents | | | | | | | |
|---|---|---|---|---|---|---|---|---|
| Maleic Anhydride | 0.6 | 0.7 | 0.8 | 0.9 | 0.6 | 0.7 | 0.8 | 0.9 |
| Phthalic Anhydride | 0.4 | 0.3 | 0.2 | 0.1 | 0.4 | 0.3 | 0.2 | 0.1 |
| Ethylene Glycol | 1.2 | 1.2 | 1.2 | 1.2 | | | | |
| Propylene Glycol | | | | | 1.2 | 1.2 | 1.2 | 1.2 | the above polyester sums being diluted with allyl or styrene monomer in a ratio dependent upon the viscosity requirement but in the general range of 70 parts polyester to 30 parts styrene, and with the aforesaid trace of organic reducing agent. It will be observed that an impregnant so constituted has no solvents to boil away, but nevertheless will evaporate in vacuo, the liquid styrene being capable of volatilizing. The ester is only slightly volatile in the viscous mass.

In carrying out our improved process, we customarily pre-heat the castings or other articles to be impregnated, in the usual manner, but allow them to return to normal or room temperature before submitting them to the impregnant. When cooled, the articles are placed in a suitable vessel, such as an autoclave, capable of withstanding both external and internal pressure and connected to both a vacuum pump and a source of compressed air, and the vessel is closed and exhausted to a pressure of about 0.735 p. s. i. absolute, corresponding to a vacuum of 28.5 inches of mercury. In the meantime, the thermosetting copolymer to be used as an impregnant is cooled to a temperature of 35° to 40° Fahrenheit. The density of the air on the surfaces of the articles having been reduced to approximately one-twentieth of the former density, and the density of the air in the micropores of the articles having been reduced to theoretically the same degree but actually probably to a somewhat higher fraction, the impregnant is admitted to the vessel which is still maintained open to the vacuum pump. It will be found that the chilled impregnant causes very little increase in pressure within the vessel, indicating that its volatile constituents are not liberated to any material degree.

The articles are permitted to remain submerged in the impregnant bath and under vacuum for approximately ten minutes to permit the impregnant to absorb any minute particles of rarified air trapped in the surface of the articles and to make an intimate and continuous liquid contact with the metal, glass, plastic, hard rubber, or whatever material composes the articles. A further advantage of cooling the impregnant may here be noted: that a cool liquid has greater affinity for air than the solid articles which will at first be slightly warmer. When sufficient time has elapsed to assure that the surfaces of the articles are completely coated without intervening air particles, the vacuum is broken and a source of compressed air is operatively connected to the vessel to effect a positive gauge pressure therein. Preferably, the pressure in the vessel is raised to between six and eight atmospheres, or approximately 100 p. s. i. gauge, and is maintained at that level for about thirty minutes. During this stage of the impregnating cycle, the impregnant is forced into the micropores by pressure and drawn into them by capillary action.

When the pressure stage of the cycle is completed, the pressure is reduced to slightly above atmospheric, and the impregnant is forced out of the vessel to be saved, re-cooled, and used again in a subsequent operation, as it will not have lost its fluidity. The vessel may then be opened to the atmosphere and the articles withdrawn and rinsed in a suitable solvent bath to remove excess surface liquid. As a final step in the process the rinsed articles are baked in a dry oven to attain a temperature of approximately 300° F., and then allowed to cool. The virtual complete absence of air in the micropores causes the impregnant to be retained in the micropores during the rinsing and baking steps.

The apparatus required to carry our process into effect being all standard and used in manners customary for the individual pieces, it has not been believed necessary to describe or to illustrate it in detail, as suitable arrangements of the apparatus will be obvious to those skilled in the art.

We claim:

The process of impregnating an article of microscopic porosity with an impregnant dependent for hardening upon polymerization under the influence of heat and having as a principal volatile component a liquid styrene monomer, which consists of: subjecting the article to a pressure not substantially exceeding 0.735 p. s. i. absolute; cooling the impregnant to a temperature at which the vapor tension of said styrene monomer at 0.735 p. s. i. absolute is substantially equivalent to its vapor tension at room temperature and atmospheric pressure; submerging said article in a bath of said cooled impregnant, while maintaining the pressure in the order of 0.735 p. s. i. absolute; then subjecting the submerged article to a pressure in excess of six atmospheres; releasing said super-atmospheric pressure and removing said article from said bath; and polymerizing the impregnant residual on said article by heat-treatment.

References Cited in the file of this patent

UNITED STATES PATENTS

| Number | Name | Date |
| --- | --- | --- |
| 1,729,056 | Texier | Sept. 24, 1929 |
| 2,140,981 | Booty | Dec. 20, 1938 |
| 2,484,215 | Foster | Oct. 11, 1949 |